United States Patent [19]

Feldmann et al.

[11] Patent Number: 4,556,259
[45] Date of Patent: Dec. 3, 1985

[54] AIR BRAKE SYSTEM

[75] Inventors: Joachim Feldmann, Neustadt; Wilhelm Schlamann, Isernhagen, both of Fed. Rep. of Germany

[73] Assignee: WABCO Westinghouse Fahrzengbremsen, Hanover, Fed. Rep. of Germany

[21] Appl. No.: 522,124

[22] Filed: Aug. 11, 1983

[30] Foreign Application Priority Data

Aug. 28, 1982 [DE] Fed. Rep. of Germany ....... 3232127

[51] Int. Cl.$^4$ .............................................. B60T 17/05
[52] U.S. Cl. ............................................ 303/7; 303/2; 303/40; 303/85
[58] Field of Search ............... 303/2, 6 M, 7, 8, 13, 303/40, 52, 57, 59, 85

[56] References Cited

U.S. PATENT DOCUMENTS

| | | | |
|---|---|---|---|
| 3,155,435 | 11/1964 | Nicolay et al. | 303/40 |
| 3,443,839 | 5/1969 | Hinrichs et al. | 303/40 X |
| 3,445,141 | 5/1965 | Mognet et al. | 303/40 X |
| 3,984,149 | 10/1976 | Reinecke et al. | 303/7 |
| 4,017,125 | 4/1977 | Durling | 303/7 |
| 4,109,968 | 8/1978 | Wood | 303/7 |
| 4,258,959 | 5/1981 | Knight et al. | 303/7 |

FOREIGN PATENT DOCUMENTS

| | | |
|---|---|---|
| 2124027 | 11/1972 | Fed. Rep. of Germany . |
| 2227778 | 12/1973 | Fed. Rep. of Germany . |
| 2453466 | 11/1976 | Fed. Rep. of Germany . |
| 2520692 | 11/1976 | Fed. Rep. of Germany . |
| 2137834 | 12/1972 | France . |
| 2306108 | 10/1976 | France . |
| 2308529 | 11/1976 | France . |
| 2045880 | 11/1980 | United Kingdom . |

Primary Examiner—Duane A. Reger
Attorney, Agent, or Firm—J. B. Sotak

[57] ABSTRACT

A compressed air brake system including a low pressure control circuit and a high pressure operating circuit. The control circuit is interfaced by a plurality of relay valves with the operating circuit for the direct actuation of the wheel brake cylinders with high pressure. The dual pressure arrangement results in a significant reduction in consumption of air while retaining the advantages which are common to a high pressure system.

8 Claims, 1 Drawing Figure

—LOW PRESSURE CIRCUIT
— —HIGH PRESSURE CIRCUIT

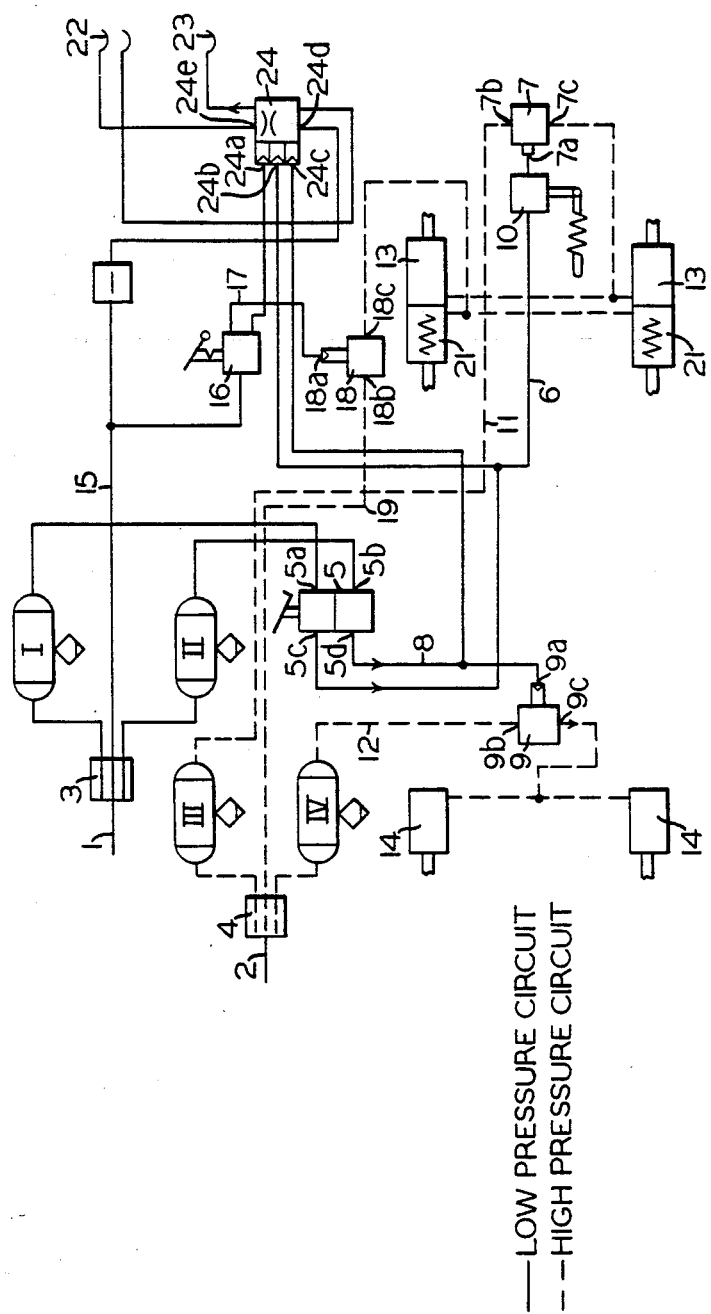

AIR BRAKE SYSTEM

FIELD OF THE INVENTION

This invention relates to an air brake system for motor vehicles having wheel brakes which are equipped with pneumatically-operable braking apparatus.

BACKGROUND OF THE INVENTION

Normally, compressed air brake systems in commercial motor vehicles operate at a maximum system pressure of approximately 7 to 8 bar.

It has been found that the restricted amount of space which is necessary for accommodating the reservoirs and brake cylinder volumes in buses and other commercial vehicles, as well as increased usage of compressed air requirements for other ancillary equipment, are some of the reasons for developing brake systems that operate at higher pressures than previous braking systems.

Further, in the design of pneumatically-operable fully-lined disc brakes, it is necessary for the purpose of providing sufficient contact between the rotors and the brake discs. Further, it is advantageous to utilize a high pressure system since greater clamping forces can be exerted by the brake pads.

Aside from the advantages achieved through a high pressure brake system, such as smaller volume of the reservoirs, which results in quicker readiness for use due to shorter filling time, and greater braking clamping forces, there are several negative characteristics. For example, a considerable problem arises primarily due to the fact that the supply lines of a compressed air brake system act as a dead volume which totally escapes into the atmosphere after a braking application. Accordingly, in a high pressure brake system having an operating pressure of 20 bar, a considerably greater volume of unused air is vented into the atmosphere than is the case with a normal pressure brake system having an operating pressure of 7 bar.

OBJECTS AND SUMMARY OF THE INVENTION

Therefore, it is an object of this invention to create a compressed air brake system for motor vehicles whereby the above-listed disadvantages of presently known high pressure brake systems are alleviated but to maintain the advantages of such a system.

A further object of this invention is to provide an air brake system for motor vehicles having wheel brakes which are equipped with pneumatically-operable brakes which includes at least one control circuit and at least one operating circuit comprising, a compressed air generating circuit including a first control circuit supplied with low pressure and a second operating circuit supplied with high pressure, the low pressure in the control circuit is lower than the brake pressure in the operating circuit, a relay valve means separates the low pressure control circuit from the high pressure operating circuit, said relay valve means includes low pressure connections which are acted upon by the low pressure control circuit and includes high pressure supply connections which are acted upon by the high pressure operating circuit and high pressure brake connections for controlling the brake pressure in accordance with the pressure in the high pressure operating circuit.

In accordance with the present invention, the compressed air brake system is made up of a low pressure circuit and a high pressure circuit. That is, a low pressure portion of approximately 8 bar forms a control circuit and a high pressure portion of approximately 20 bar forms an operating circuit so that a significant reduction in air consumption is achieved. This is due to the fact of the installation of the relay valve means which separates the two circuits near the brake cylinder so that a substantially smaller portion of the total line system is activated with high pressure. Thus, the major portion of the system, namely, the component of the control circuit, is acted upon by low pressure. Accordingly, the energy consumption per braking action becomes less so that supply tanks can be designed smaller and the filling time of the tanks at start-up becomes shorter.

DESCRIPTION OF THE DRAWING

The single FIGURE of the drawing shows a pneumatic motor vehicle braking arrangement which consists of a two-stage operational brake system and a spring-loaded auxiliary locking brake system having a two-line pneumatic trailer brake connection.

DETAILED DESCRIPTION OF THE INVENTION

Referring to the single FIGURE of the drawing, there is shown a compressed air braking stem consisting of a low pressure supply line 1 and a high pressure supply line 2.

The low pressure circuit depicted by the solid lines includes a pair of reservoirs or storage tanks I and II which are connected from supply line 1 by a first three-stage protective valve 3. The high pressure circuit depicted by the dashed lines includes a pair of reservoirs or storage tanks III and IV connected from supply line 2 by a second two-stage protective valve 4. A two-stage brake valve 5 is associated with the control circuit of the brake system and is connected from the outputs of the low pressure storage tanks I, II to the respective input connections 5a, 5b. The two-stage brake valve 5 also has two output connections 5c, 5d. The first output port 5c is connected via a line 6 to a low pressure control connection 7a of a first relay valve 7 which is associated with the rear axle brake circuit. The second output port 5d is connected via a line 8 to a low pressure control connection 9a of a second relay valve 9 which is associated with the front axle brake circuit. It will be understood that the rear axle brake circuit is controlled in a load-responsive manner. As shown, the line 6 leading from the first output port 5c of the two-stage brake valve 5 is connected through a load-responsive brake force control mechanism 10 to the low pressure control connection 7a of the first relay valve 7. Thus, brake control mechanism 10 regulates the low pressure of the low pressure circuit of the compressed air generating system.

The first and second relay valves 7 and 9 have respective high pressure supply or input connections 7b and 9b. That is, the high pressure portion of the compressed air generating system is supplied via the inputs of relay valves 7 and 9. Thus, the high pressure supply connection 7b of the first relay valve 7 is connected via a line 11 to the high pressure storage tank III, and the counterpart connection 9b of the second relay valve 9 is connected to the high pressure storage tank IV via a conduit or line 12. The valves 7 and 9 include the respective output brake connections 7c and 9c which form the respective fluid connections for the brake cylinder 13 of the rear axle and the brake cylinder 14 of the front axle, respectively.

The control portion of the auxiliary locking brake system extends from the three-stage protective valve 3 which is associated with the low pressure circuit of the compressed air generating system. That is, a fluid path extends from the output of valve 3 through a line 15, a manual brake valve 16 and a line 17 to the low pressure control connection 18a of a third relay valve 18. A high pressure supply connection 18b of the third relay valve 18 is connected to the three-stage protective valve 4 which is associated with the high pressure portion of the compressed air generating system via a line 19. The high pressure output brake connection 18c of the relay valve 18 is connected by a line 20 which creates a fluid connection for the spring-loaded cylinder 21 of the auxiliary locking brake system for the rear axles.

The two-line trailer brake connection consists of a supply coupling 22 and a brake coupling 23. The supply coupling 22 and the brake coupling 23 are connected to the low pressure of the low pressure portion of the compressed air generating system or also to the low pressure of the control circuit of the vehicle brake system through the two-stage brake valve 5 and the manual brake valve 16 which serve as control devices. As shown, a trailer control valve 24 provides the connection element of this system with the couplings 22, 23.

The following is a description of the three portions of the pneumatic motor vehicle braking arrangement:

1. Operating Brake Mechanism

When the two-stage brake valve 5 is activated, the compressed air of the low pressure storage tanks I and II, which is conveyed to connections 5a and 5b, flows from connections 5c and 5d to the low pressure control connections 7a and 9a of the relay valves 7 and 9. The relay valves 7 and 9 will be opened in relationship to the amount of low control pressure so that the levels of compressed air at the high pressure supply connections 7b and 9b which is conveyed from the high pressure storage tanks III, IV will flow into the operational brake cylinders 13 and 14 via the high pressure connections 7c and 9c. The load-controlled pressure-regulating valve mechanism 10 which is connected in series with the relay valve 7, controls the control pressure to the weight of the vehicle.

2. Auxiliary Locking Brake Mechanism

When the manual brake valve 16 is operated, the compressed air increases and flows from the low pressure portion of the compressed air generating system via line 15 to the low pressure control connection 18a of the relay valve 18. The relay valve 18 opens and the high level of compressed air coming from the high pressure portion of the compressed air generating system via the high pressure connection 18c flows into the spring-loaded cylinders 21 so that the tensional force of the spring elements of the spring-loaded cylinders 21 causes a braking action. To release the spring-loaded brake, the lines 19, 20 must be vented by means of the function of the relay valve 18 through operation of the manual brake valve 16, in order to release the tensional force of the spring elements of the spring-loaded cylinder 21.

3. Trailer Brake Mechanism

The operation of the trailer brake mechanism is controlled by the tripping of the two-stage brake valve 5 as well as the operation of the manual brake valve 16 via the trailer control valve 24 and the brake coupling 23. Thus, the trailer control valve 24 is provided with two control connections 24b, 24c for controlling both operational brake circuits of the two-stage brake valve 5 and is provided with a control connection 24a for being controlled by the manual brake valve 16. The pressure in supply line 15 flows through the trailer control valve 24 via its connections 24d and 24e to the supply coupling 22.

It will be appreciated that various changes and modifications may be made to the present invention and, therefore, it is understood that certain substitutions, variations and equipments will occur to those skilled in the art and will fall within the spirit and scope of the appended claims.

Having thus described our invention what we claim as new and desire to secure by Letters Patent, is:

1. A compressed air brake system for motor vehicles having wheel brakes which are equipped with pneumatically-operable brakes which includes at least one control circuit and at least one operating circuit comprising:
    (a) compressed air generating circuit including a first control circuit supplied with low pressure and a second operating circuit supplied with higher pressure,
    (b) the low pressure in the control circuit is lower than the brake pressure in the operating circuit,
    (c) a relay valve means separates the low pressure control circuit from the high pressure operating circuit,
    (d) said relay valve means includes low pressure control connections which are acted upon by the low pressure control circuit and includes high pressure supply connections which are acted upon by the high pressure operating circuit, and high pressure brake connections for supplying the brake pressure into the high pressure operating circuit,
    (e) a multi-stage protective valve means is interposed in the supply lines leading from the compressed air generating circuit to a plurality of storage tanks,
    (f) the system includes front and rear operational brake circuits,
    (g) a multi-stage brake valve for separating the control circuit,
    (h) the multi-stage brake valve provides separate connections to selected ones of the plurality of storage tanks,
    (i) the multi-stage brake valve controls the relay valve means associated with the operational brake circuits,
    (j) the high pressure supply connections of the relay valve means are connected to selected others of the plurality of storage tanks, and
    (k) the high pressure brake connections relay valve means are each connected to a respective wheel brake cylinder of divided vehicle axles.

2. The compressed air brake system, as defined in claim 1, wherein:
    (a) the system includes an auxiliary locking brake circuit, (b) the auxiliary locking brake circuit is controlled by a manual brake valve arranged in the low pressure control circuit, (c) the manual brake valve is connected to a three-circuit protective valve, (d) the manual brake valve controls a relay valve which is associated with the auxiliary locking brake circuit, (e) the relay valve is connected to a three-circuit protective valve, and (f) the relay valve is connected to spring-loaded brake cylinders of at least one vehicle axle.

3. The compressed air brake system, as defined in claim 1, wherein:

(a) the system includes a trailer control circuit for a trailer brake system, (b) the trailer brake system includes a trailer control valve associated with the trailer control circuit, (c) the trailer control valve is controlled by the low pressure control circuit, (d) the trailer control valve is connected to the supply connection of a three-circuit valve, and (e) the trailer control valve is connected into the trailer control line which serves to control the trailer brake valve associated with the trailer brake system.

4. The compressed air brake system, as defined in claim 1, wherein a load-related brake force regulating mechanism is connected between the multi-stage brake valve and the relay valve means.

5. The compressed air brake system, as defined in claim 4, wherein the relay valve means and the brake force regulating mechanism are connected in series.

6. The compressed air brake system, as defined in claim 4, wherein the multi-stage brake valve, the relay valve means, and the brake force regulating mechanism are connected in series.

7. The compressed air brake system, as defined in claim 1, wherein the multi-stage brake valve and the relay valve are connected together by the brake force regulating mechanism.

8. The compressed air brake system, as defined in claim 2, wherein the auxiliary locking brake cylinder is modulated by the manual brake valve.

* * * * *